(12) United States Patent
Park et al.

(10) Patent No.: US 10,928,901 B2
(45) Date of Patent: Feb. 23, 2021

(54) CALIBRATION METHOD FOR THREE-DIMENSIONAL (3D) AUGMENTED REALITY AND APPARATUS THEREOF

(71) Applicant: SAMSUNG ELECTRONICS CO., LTD., Suwon-si (KR)

(72) Inventors: Juyong Park, Seongnam-si (KR); Seok Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/400,100

(22) Filed: May 1, 2019

(65) Prior Publication Data
US 2020/0174560 A1 Jun. 4, 2020

(30) Foreign Application Priority Data
Dec. 4, 2018 (KR) .......................... 10-2018-0154709

(51) Int. Cl.
*G06F 3/01* (2006.01)
*G06T 7/80* (2017.01)
*G06T 19/00* (2011.01)
*G06T 7/00* (2017.01)
*G06T 7/73* (2017.01)

(52) U.S. Cl.
CPC ................ *G06F 3/013* (2013.01); *G06T 7/73* (2017.01); *G06T 7/80* (2017.01); *G06T 7/97* (2017.01); *G06T 19/006* (2013.01)

(58) Field of Classification Search
None
See application file for complete search history.

(56) References Cited

U.S. PATENT DOCUMENTS

| | | | |
|---|---|---|---|
| 6,750,832 B1 * | 6/2004 | Kleinschmidt | B60K 35/00 345/7 |
| 8,890,865 B2 | 11/2014 | Park et al. | |
| 10,653,314 B2 * | 5/2020 | Pascal | A61B 3/0041 |
| 2003/0169213 A1 * | 9/2003 | Spero | G02B 5/20 345/7 |
| 2016/0236619 A1 | 8/2016 | Tanaka et al. | |
| 2016/0377873 A1 * | 12/2016 | Kimura | G06K 9/00832 345/682 |
| 2017/0169612 A1 | 6/2017 | Cashen et al. | |
| 2018/0157036 A1 * | 6/2018 | Choi | G02B 27/0101 |

FOREIGN PATENT DOCUMENTS

| | | |
|---|---|---|
| JP | 4702348 B2 | 6/2011 |
| JP | 2017-47794 A | 3/2017 |
| KR | 10-1526424 B1 | 6/2015 |

* cited by examiner

*Primary Examiner* — Jeffrey J Chow
(74) *Attorney, Agent, or Firm* — Sughrue Mion, PLLC

(57) ABSTRACT

A calibration method for a three-dimensional (3D) augmented reality and an apparatus thereof are provided. The calibration method includes determining a first conversion parameter representing a relationship between a coordinate system of an eye-tracking camera and a coordinate system of a calibration camera by capturing a physical pattern using the eye-tracking camera and the calibration camera, and determining a second conversion parameter representing a relationship between a coordinate system of a virtual screen and the coordinate system of the calibration camera and a size parameter representing a size of the virtual screen by capturing a virtual pattern displayed on the virtual screen using the calibration camera.

21 Claims, 13 Drawing Sheets

CALIBRATION METHOD FOR THREE-DIMENSIONAL (3D) AUGMENTED REALITY AND APPARATUS THEREOF

CROSS-REFERENCE TO RELATED APPLICATION

This application is based on and claims priority from Korean Patent Application No. 10-2018-0154709, filed on Dec. 4, 2018 in the Korean Intellectual Property Office, the disclosure of which is incorporated herein by reference in its entirety.

BACKGROUND

1. Field

Methods and apparatuses consistent with exemplary embodiments of this disclosure relate to a calibration method for a three-dimensional (3D) augmented reality and apparatus thereof.

2. Description of the Related Art

A head-up display (HUD) system generates a virtual image in front of a driver and displays information in the virtual image to provide various information to the driver. The information provided to the driver may include instrument panel information such as car speed, remaining amount of fuel, engine revolution per minute (RPM), and navigation information. The driver may easily grasp the information displayed on the front without moving his or her gaze while driving, and thus a driving stability and safety may be enhanced. In addition to the instrument panel information and the navigation information, the HUD system may provide the driver with information such as lane marking, a construction sign, a traffic accident sign, and a warning sign indicating a passenger for providing an assistance in case of poor front view based on an augmented reality (AR) technique.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of the disclosure, there is provided a calibration method for a three-dimensional (3D) augmented reality, the method comprising: determining a first conversion parameter representing a first relationship between a first coordinate system of an eye-tracking camera and a second coordinate system of a calibration camera by capturing a physical pattern using the eye-tracking camera and the calibration camera; determining a second conversion parameter representing a second relationship between a third coordinate system of a virtual screen and the second coordinate system of the calibration camera and a size parameter representing a size of the virtual screen by capturing a virtual pattern displayed on the virtual screen using the calibration camera; and estimating a conversion relationship between the first coordinate system of the eye-tracking camera and the third coordinate system of the virtual screen based on the first conversion parameter, the second conversion parameter, and the size parameter.

The determining of the first conversion parameter may comprise: determining a third conversion parameter representing a third relationship between the first coordinate system of the eye-tracking camera and a fourth coordinate system of the physical pattern based on an image acquired by the eye-tracking camera from capturing a reflector illuminating the physical pattern; determining a fourth conversion parameter representing a fourth relationship between the second coordinate system of the calibration camera and the fourth coordinate system of the physical pattern based on an image acquired by the calibration camera from capturing the physical pattern; and determining the first conversion parameter based on the third conversion parameter between the first coordinate system of the eye-tracking camera and the fourth coordinate system of the physical pattern and the fourth conversion parameter between the second coordinate system of the calibration camera and the fourth coordinate system of the physical pattern.

The determining of the second conversion parameter and the size parameter may comprise: estimating positions of feature points included in the virtual pattern based on images acquired by the calibration camera capturing the virtual pattern; and determining the second conversion parameter and the size parameter based on the estimated positions of the feature points.

The determining of the second conversion parameter and the size parameter may comprises: estimating positions of feature points included in the virtual pattern based on images acquired by the calibration camera capturing the virtual pattern; parameterizing the positions of the feature points based on the third coordinate system of the virtual screen; and determining the second conversion parameter and the size parameter by minimizing differences between the estimated positions of the feature points and the parameterized positions of the feature points.

The estimating of the positions of the feature points may comprise: estimating 3D positions of the feature points based on two-dimensional (2D) positions of the feature points appearing in an image acquired by a first sub-camera of the calibration camera capturing the virtual pattern, 2D positions of the feature points appearing in an image acquired by a second sub-camera of the calibration camera capturing the virtual pattern, and a conversion parameter between a fifth coordinate system of the first sub-camera and a sixth coordinate system of the second sub-camera.

The parameterizing of the positions of the feature points may comprise: parameterizing the positions of the feature points based on a size of a unit cell of the virtual pattern.

The size parameter may include values representing leftmost, rightmost, uppermost, and lowermost boundaries of the virtual screen.

The calibration method may further comprise: determining intrinsic parameters of the eye-tracking camera and the calibration camera and a conversion parameter between a fifth coordinate system of a first sub-camera of the calibration camera and a sixth coordinate system of a second sub-camera of the calibration camera.

An image for a 3D augmented reality may be rendered based on the conversion relationship between the first coordinate system of the eye-tracking camera and the third coordinate system of the virtual screen.

A non-transitory computer-readable storage medium may store instructions that, when executed by a processor, cause the processor to perform the calibration method described above.

According to another aspect of the disclosure, there is provided a calibration apparatus for a three-dimensional (3D) augmented reality, the apparatus comprising: a memory configured to store one or more instructions; and a processor, when the one or more instructions are executed, configured to: determine a first conversion parameter representing a first relationship between a first coordinate system of an eye-tracking camera and a second coordinate system of a calibration camera by capturing a physical pattern using the eye-tracking camera and the calibration camera; determine a second conversion parameter representing a second relationship between a third coordinate system of a virtual screen and the second coordinate system of the calibration camera and a size parameter representing a size of the virtual screen by capturing a virtual pattern displayed on the virtual screen using the calibration camera; and estimate a conversion relationship between the first coordinate system of the eye-tracking camera and the third coordinate system of the virtual screen based on the first conversion parameter, the second conversion parameter, and the size parameter.

The processor may be further configured to: determine a third conversion parameter representing a third relationship between the first coordinate system of the eye-tracking camera and a fourth coordinate system of the physical pattern based on an image acquired by the eye-tracking camera from capturing a reflector illuminating the physical pattern; determine a fourth conversion parameter representing a fourth relationship between the second coordinate system of the calibration camera and the fourth coordinate system of the physical pattern based on an image acquired by the calibration camera from capturing the physical pattern; and determine the first conversion parameter based on the third conversion parameter between the first coordinate system of the eye-tracking camera and the fourth coordinate system of the physical pattern and the fourth conversion parameter between the second coordinate system of the calibration camera and the fourth coordinate system of the physical pattern.

The processor may be further configured to: estimate positions of feature points included in the virtual pattern based on images acquired by the calibration camera capturing the virtual pattern; and determine the second conversion parameter and the size parameter based on the estimated positions of the feature points.

The processor may be further configured to: estimate positions of feature points included in the virtual pattern based on images acquired by the calibration camera capturing the virtual pattern; parameterize the positions of the feature points based on the third coordinate system of the virtual screen; and determine the second conversion parameter and the size parameter by minimizing differences between the estimated positions of the feature points and the parameterized positions of the feature points.

The processor may be further configured to estimate 3D positions of the feature points based on two-dimensional (2D) positions of the feature points appearing in an image acquired by a first sub-camera of the calibration camera capturing the virtual pattern, 2D positions of the feature points appearing in an image acquired by a second sub-camera of the calibration camera capturing the virtual pattern, and a conversion parameter between a fifth coordinate system of the first sub-camera and a sixth coordinate system of the second sub-camera.

The processor may be further configured to parameterize the positions of the feature points based on a size of a unit cell of the virtual pattern.

According to another aspect of the disclosure, there is provided a calibration system for a three-dimensional (3D) augmented reality, the system comprising: a physical screen comprising a physical pattern; a display device configured to generate a virtual screen comprising a virtual pattern; an eye-tracking camera configured to capture the physical pattern; a calibration camera configured to capture the physical pattern and the virtual pattern; and a processor configured to determine a first conversion parameter representing a first relationship between a first coordinate system of the eye-tracking camera and a second coordinate system of the calibration camera based on images generated by the eye-tracking camera and the calibration camera, a second conversion parameter representing a second relationship between a third coordinate system of the virtual screen and the second coordinate system of the calibration camera, and a size parameter representing a size of the virtual screen.

The processor may be further configured to estimate a conversion relationship between the first coordinate system of the eye-tracking camera and the third coordinate system of the virtual screen based on the first conversion parameter, the second conversion parameter, and the size parameter.

The processor may be further configured to: determine a third conversion parameter representing a third relationship between the first coordinate system of the eye-tracking camera and a fourth coordinate system of the physical pattern based on an image acquired by the eye-tracking camera from capturing a reflector illuminating the physical pattern; determine a fourth conversion parameter representing a fourth relationship between the second coordinate system of the calibration camera and the fourth coordinate system of the physical pattern based on an image acquired by the calibration camera from capturing the physical pattern; and determine the first conversion parameter based on the third conversion parameter between the first coordinate system of the eye-tracking camera and the fourth coordinate system of the physical pattern and the fourth conversion parameter between the second coordinate system of the calibration camera and the fourth coordinate system of the physical pattern.

The processor may be further configured to: estimate positions of feature points included in the virtual pattern based on images acquired by the calibration camera capturing the virtual pattern; and determine the second conversion parameter and the size parameter based on the estimated positions of the feature points.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
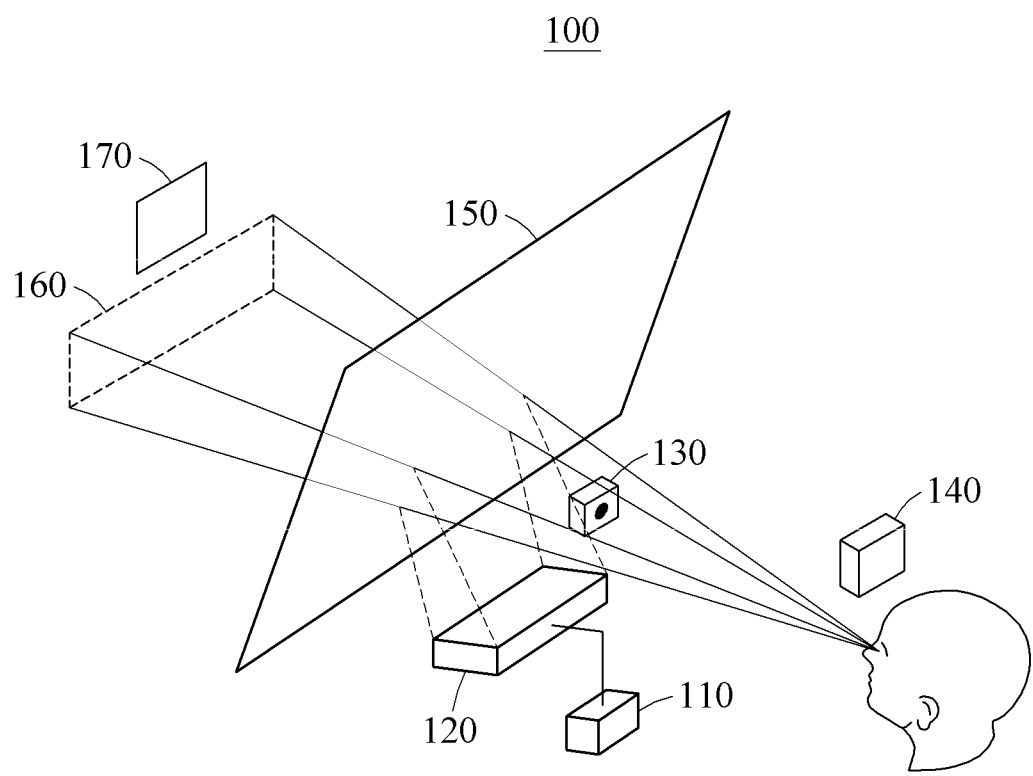
FIG. 1 is a diagram illustrating a calibration system according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 is a diagram illustrating a calibration system according to an exemplary embodiment.

Referring to FIG. 1, a calibration system 100 includes a calibration apparatus 110, a display device 120, an eye-tracking camera 130, and a calibration camera 140. The display device 120 may provide a three-dimensional (3D) image based on an augmented reality (AR) technique. An AR may be applicable to a head-up display (HUD), a transmissive head mounted display (HMD), and the like. Hereinafter, the description will be made based on the HUD and may also applicable to an HMD. For example, the display device 120 may provide a 3D AR HUD. Information provided through an AR HUD may include, for example, instrument panel information, navigation information, lane marking, a construction sign, a traffic accident sign, and a warning sign indicating passengers.

The display device 120 may include a light source, a display panel, and at least one optical element. The at least one optical element may include a catadioptric system. The display panel and the light source of the display device 120 may provide light corresponding to an AR image. Also, the catadioptric system may reflect the light corresponding to the AR image toward a translucent optical element 150. In this example, the catadioptric system may refract the light corresponding to the AR image such that the AR image is enlarged. As the light source, a light emitting diode (LED) or a laser may be used.

A virtual screen 160 may be formed by the light corresponding to the AR image and provided from the display device 120. A portion of the light provided from the display device 120 may be reflected at the translucent optical element 150 located in front of a user and provided to the user. The translucent optical element 150 may be a windshield of a vehicle or an aircraft, or a combiner provided separate from the windshield to reflect the AR image. The user may simultaneously view the light coming from the front of the translucent optical element 150 and a portion of light emitted from the display device 120 and reflected by the translucent optical element 150. Thus, the user may view a real object and a virtual object overlapping each other.

The display device 120 may display the virtual object at a position corresponding to the real object. For example, information on a driving direction of a vehicle on the HUD, lane information, and obstacle information may be displayed at the position corresponding to the real object as the virtual object. Hereinafter, a position at which the virtual object is to be displayed in a background may be referred to as a target position. To accurately display the virtual object at the target position, a conversion relationship between a coordinate system of the eye-tracking camera 130 and a coordinate system of the virtual screen 160, 3D background information, and eye-position information may be required. The 3D background information may be acquired by a 3D sensor or a camera capturing a front view from a vehicle. The eye-position of the user may be acquired by the eye-tracking camera 130 facing the user. The display device 120 may display the virtual object at an intersection point between the virtual screen 160 and a line connecting the eye-position of the user and the target position.

The at least one optical element of the display device 120 may include a 3D optical layer. The display device 120 may provide a 3D image through a 3D optical layer. The 3D optical layer may be any one of a parallax barrier, a lenticular lens, and a directional back light unit. The display device 120 may generate a left image for a left eye and a right image for a right eye and render a 3D image based on the eye-position obtained by the eye-tracking camera 130, the left image, and the right image. The 3D image may be output through the 3D optical layer, so that different images are provided to both eyes of the user. The display device 120 may display the virtual object at the intersection point between the virtual screen 160 and the line connecting the eye-position and the target position for each of the left image and the right image.

Figure 2:
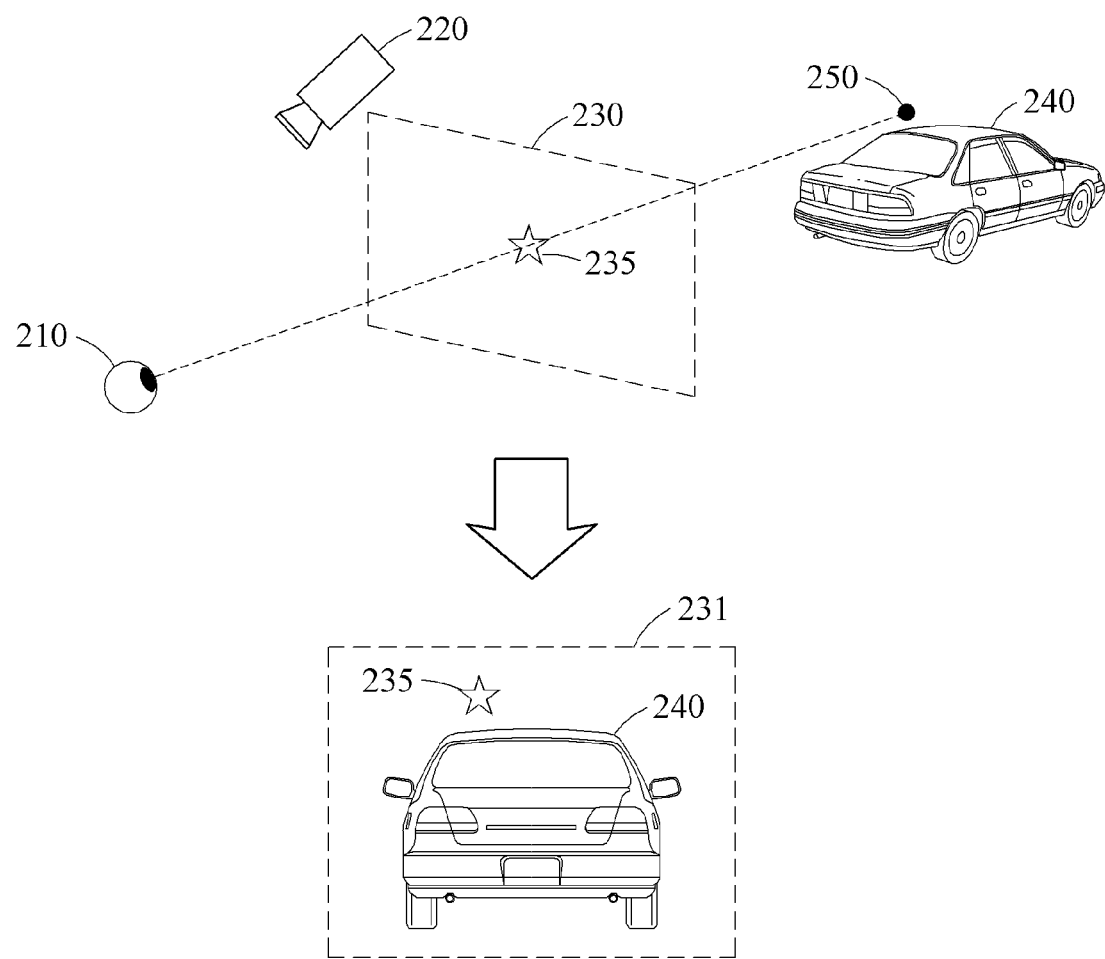
FIG. 2 is a diagram illustrating a three-dimensional (3D) augmented reality according to an exemplary embodiment.

FIG. 2 is a diagram illustrating a 3D augmented reality according to an exemplary embodiment. Referring to FIG. 2, a virtual object 235 may be displayed at an intersection point between a virtual screen 230 and a line connecting an eye 210 of a user and a target position 250. The eye 210 may be tracked by an eye-tracking camera 220. In this example, a virtual screen 231 may be viewed at a position of the eye 210. The virtual screen 231 may include the virtual object 235 and a real object 240. The virtual object 235 may be accurately displayed at the target position. Such process may be performed on each of a left eye and a right eye. For example, a left image may be generated such that the virtual object 235 is displayed at an intersection point between the virtual screen 230 and a line connecting the left eye and the target position 250. Also, a right image may be generated such that the virtual object 235 is displayed at an intersection point between the virtual screen 230 and a line connecting the right eye and the target position 250. Through the process, a 3D AR may be provided. The 3D AR may more accurately display a virtual object at a target position as compared to a two-dimensional (2D) AR.

Referring back to FIG. 1, to accurately display the virtual object at a point corresponding to the target position on the virtual screen 160, a conversion relationship between a coordinate system of the eye-tracking camera 130 and a coordinate system of the virtual screen 160 may be accurately estimated. The calibration apparatus 110 may calibrate parameters for estimating the coordinate system of the eye-tracking camera 130 and the coordinate system of the virtual screen 160 using a virtual pattern on the virtual screen 160, a physical pattern on a physical pattern 170, and the calibration camera 140. The physical pattern 170 may be displayed on a physical screen. The parameters may be calibrated in a process of system production, a process of system installation, or a process of system utilization. For example, calibration may be provided as part of customer service such as repairing a vehicle.

A parameter requiring the calibration may include a conversion parameter representing a relationship between the coordinate system of the eye-tracking camera 130 and the coordinate system of the calibration camera 140 (hereinafter, referred to as a first conversion parameter), a conversion parameter representing a relationship between the coordinate system of the virtual screen 160 and the coordinate system of the calibration camera 140 (hereinafter, referred to as a second conversion parameter), and a size parameter representing a size of the virtual screen 160. The conversion parameter may correspond to an extrinsic parameter or a relative coordinate. The extrinsic parameter may include a rotation parameter and a translation parameter. For example, by using the first conversion parameter and the second conversion parameter, coordinates of the virtual screen 160 may be converted into coordinates of the eye-tracking camera 130. The size parameter of the virtual screen 160 may include values indicating leftmost, rightmost, uppermost, and lowermost boundaries of the virtual screen 160.

The physical pattern 170, the calibration camera 140, and the calibration apparatus 110 may be temporarily installed for a calibration process. The calibration camera 140 may include a plurality of sub-cameras. The following description will be made based on a case in which the calibration camera 140 is a stereo camera and may also be applicable to a case in which the calibration camera 140 includes three or more sub-cameras. One of the plurality of sub-cameras included in the calibration camera 140 may be set as a representative camera. Hereinafter, a parameter associated with the calibration camera 140 may be a parameter of the representative camera. For example, the coordinate system of the calibration camera 140 may be a coordinate system of the representative camera.

Figure 3:
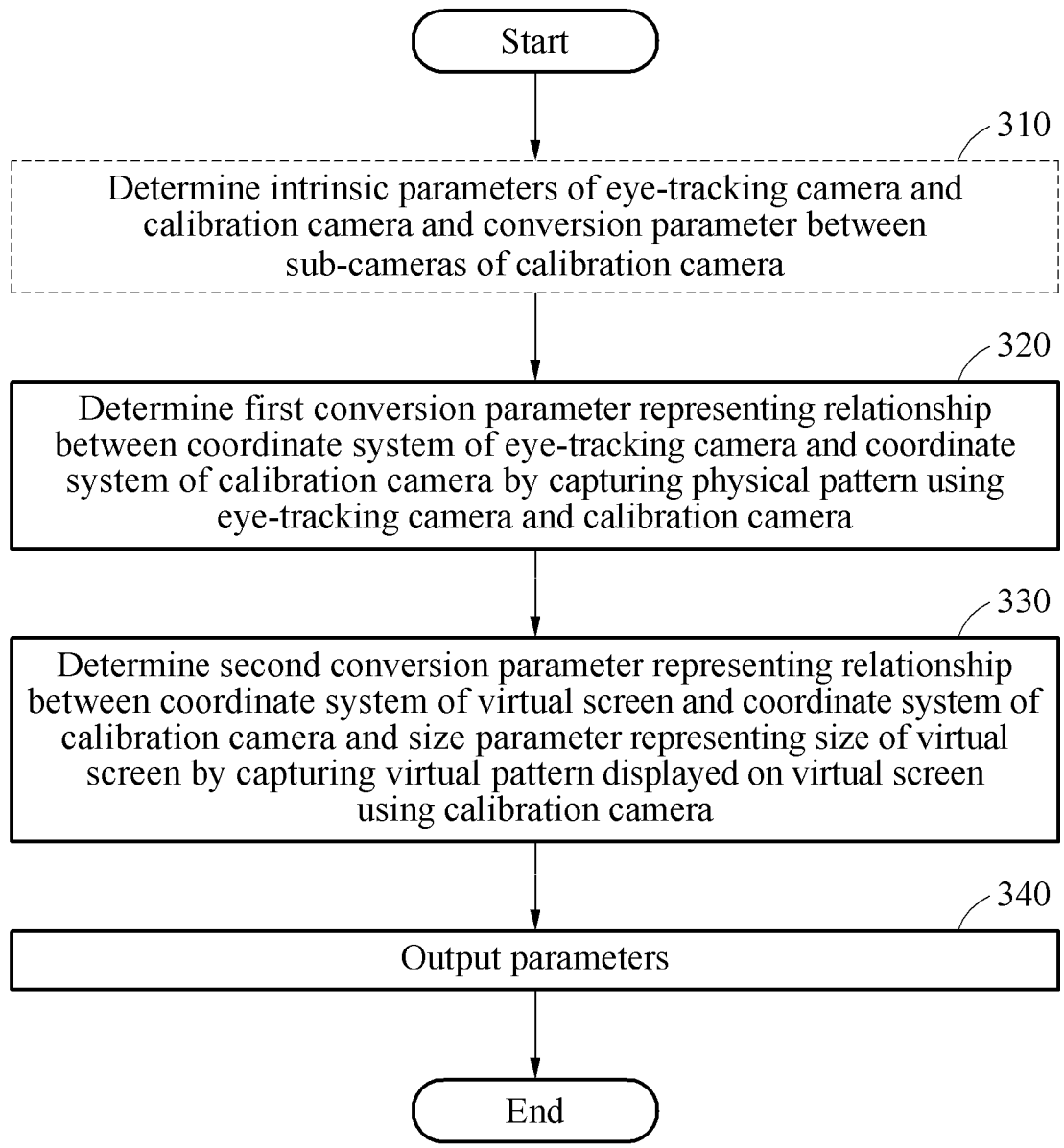
FIG. 3 is a flowchart illustrating a calibration method according to an exemplary embodiment.

FIG. 3 is a flowchart illustrating a calibration method according to an exemplary embodiment.

Referring to FIG. 3, in operation 310, a calibration apparatus determines intrinsic parameters of an eye-tracking camera and a calibration camera and a conversion parameter between sub-cameras of the calibration camera. For example, the calibration camera may include a first sub-camera and a second sub-camera. Also, the calibration camera may determine a coordinate system of the first sub-camera and a coordinate system of the second sub-camera. The intrinsic parameter may include a focal length, a principal point, and a skew coefficient.

Operation 310 may be performed independently of operations 320 and 330. The calibration apparatus may determine the intrinsic parameters of the eye-tracking camera and the calibration camera and the conversion parameter between the sub-cameras of the calibration camera by capturing a pattern using the eye-tracking camera and the calibration camera. The calibration apparatus may know a characteristic of the pattern and may capture the pattern a plurality of times for parameter determination. The characteristic of the pattern may include a size of a unit cell (or an interval between cells) and an arrangement of cells (for example, a number of cells). The pattern used in operation 310 may be different from a physical pattern used in operation 320 and a virtual pattern used in operation 330.

In operation 320, the calibration apparatus determines a first conversion parameter representing a relationship between a coordinate system of the eye-tracking camera and a coordinate system of the calibration camera by capturing a physical pattern using the eye-tracking camera and the calibration camera. Here, the coordinate system of the calibration camera may be a coordinate system of a representative camera of the calibration camera and the first conversion parameter may represent a relationship between the coordinate system of the eye-tracking camera and the coordinate system of the representative camera. The calibration apparatus may know a characteristic of the physical pattern and may capture the physical pattern a plurality of times for parameter determination.

Figure 13:
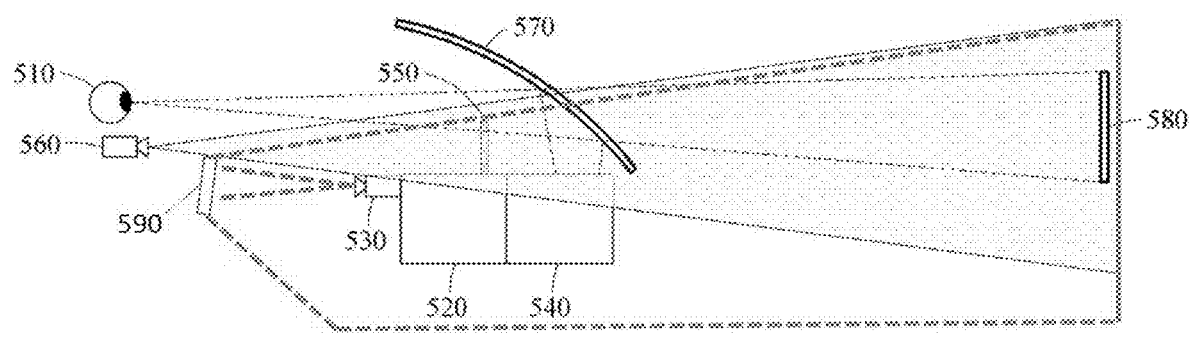
FIG. 13 is a diagram illustrating an arrangement of elements for estimating a relationship between a coordinate system of an eye-tracking camera and a coordinate system of a calibration camera according to an exemplary embodiment.

The calibration apparatus may determine a conversion parameter representing a relationship between the coordinate system of the eye-tracking camera 530 and a coordinate system of the physical pattern based on an image acquired by the eye-tracking camera 530 capturing a reflector 590 illuminating the physical pattern as illustrated according to an exemplary embodiment in FIG. 13. Also, the calibration apparatus may determine a conversion parameter between the coordinate system of the calibration camera and the coordinate system of the physical pattern based on an image acquired by the calibration camera capturing the physical pattern. Here, the calibration camera 560 capturing the physical pattern may be a representative camera of the calibration camera, and a conversion parameter between the coordinate system of the physical pattern and a coordinate system of the representative camera may be determined. The reflector may 560 include a mirror.

Figure 4:
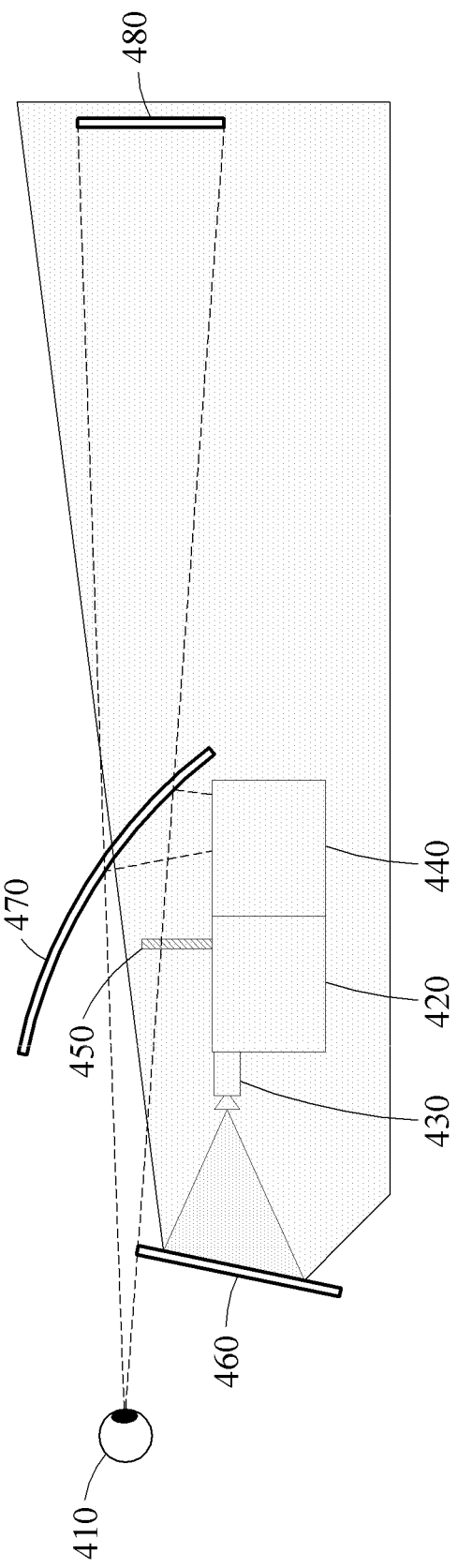
FIGS. 4 and 5 are diagrams illustrating an arrangement of elements for estimating a relationship between a coordinate system of an eye-tracking camera and a coordinate system of a calibration camera according to an exemplary embodiment.
Figure 5:
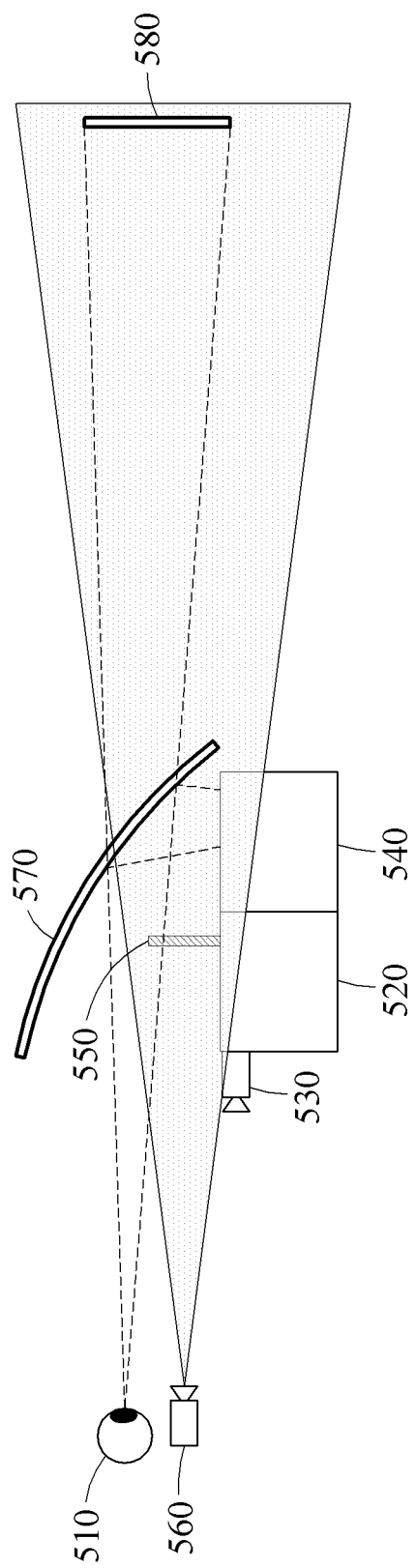
Figure 6:
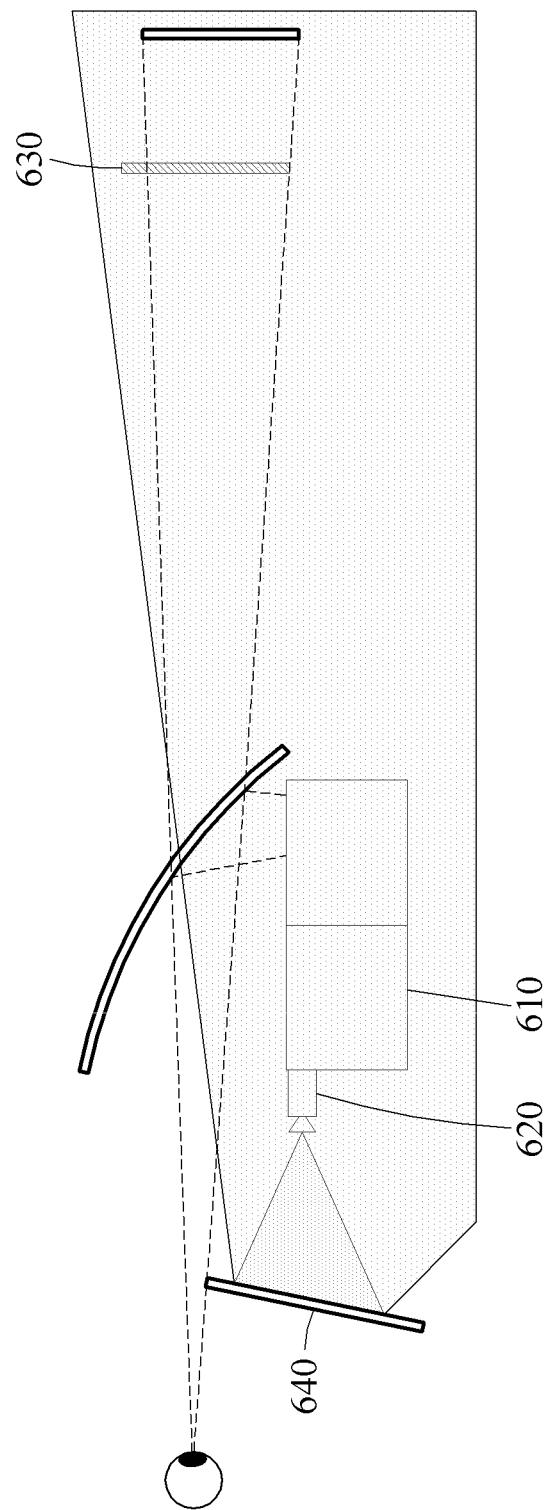
FIGS. 6 and 7 are diagrams illustrating an arrangement of elements for estimating a relationship between a coordinate system of an eye-tracking camera and a coordinate system of a calibration camera according to an exemplary embodiment.
Figure 7:
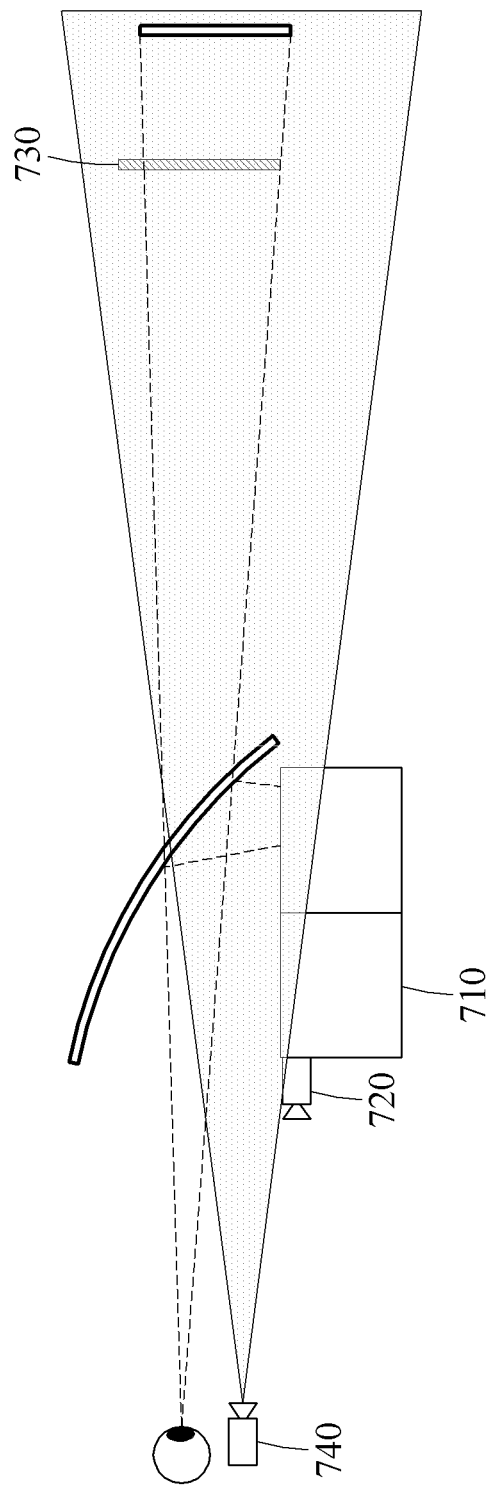

The calibration apparatus may determine the first conversion parameter based on the determined conversion parameter between the coordinate system of the eye-tracking camera and the determined conversion parameter between the coordinate system of the calibration camera and the coordinate system of the physical pattern. Operation 320 will be further described with reference to FIGS. 4 through 7. FIGS. 4 and 5 illustrate examples in which a physical pattern is located internal to a vehicle and FIGS. 6 and 7 illustrates examples in which a physical pattern is located external to a vehicle. In the examples of FIGS. 4 and 5, an eye-tracking camera may indirectly capture the physical pattern using a reflector. In the examples of FIGS. 6 and 7, an eye-tracking camera may directly capture the physical pattern.

FIGS. 4 and 5 are diagrams illustrating an arrangement of elements for estimating a relationship between a coordinate system of an eye-tracking camera and a coordinate system of a calibration camera according to an exemplary embodiment.

FIG. 4 illustrates an arrangement of a user's eye 410, a calibration apparatus 420, an eye-tracking camera 430, a display device 440, a physical pattern 450, a reflector 460, a translucent optical element 470, and a virtual screen 480. The eye-tracking camera 430 may capture the physical pattern 450 illuminated by the reflector 460. The calibration apparatus 420 may determine a conversion parameter representing a relationship between a coordinate system of the eye-tracking camera 430 and a coordinate system of the physical pattern 450 based on an image acquired by the eye-tracking camera 430 capturing the reflector 460 illuminating the physical pattern 450.

FIG. 5 illustrates an arrangement of a user's eye 510, a calibration apparatus 520, an eye-tracking camera 530, a display device 540, a physical pattern 550, a calibration camera 560, a translucent optical element 570, and a virtual screen 580. The calibration camera 560 may capture the physical pattern 550. The calibration apparatus 520 may determine a conversion parameter between a coordinate system of the calibration camera 560 and a coordinate system of the physical pattern 550 based on an image acquired by the calibration camera 560 capturing the physical pattern 550.

FIGS. 6 and 7 are diagrams illustrating an arrangement of elements for estimating a relationship between a coordinate system of an eye-tracking camera and a coordinate system of a calibration camera according to an exemplary embodiment.

Referring to FIG. 6, an eye-tracking camera 620 may capture a physical pattern 630 illuminated by a reflector 640. A calibration apparatus 610 may determine a conversion parameter representing a relationship between a coordinate system of the eye-tracking camera 620 and a coordinate system of the physical pattern 630 based on an image acquired by the eye-tracking camera 620 capturing the reflector 640 illuminating the physical pattern 630. Referring to FIG. 7, a calibration camera 740 may capture a physical pattern 730. A calibration apparatus 710 may determine a conversion parameter representing a coordinate system of the calibration camera 740 and a coordinate system of the physical pattern 730 based on an image acquired by the calibration camera 740 capturing the physical pattern 730.

Referring back to FIG. 3, in operation 330, the calibration apparatus determines a second conversion parameter representing a relationship between the coordinate system of the virtual screen and the coordinate system of the calibration camera and a size parameter representing a size of the virtual screen by capturing the virtual pattern displayed on the virtual screen using the calibration camera. The calibration apparatus may estimate positions of feature points included in the virtual pattern based on images acquired by the calibration camera capturing the virtual pattern and determine the second conversion parameter and the size parameter based on the estimated positions of the feature points. For example, the calibration apparatus may determine the second conversion parameter and the size parameter by parameterizing the positions of the feature points based on the coordinate system of the virtual screen and fitting differences between the estimated positions of the feature points and the parameterized positions of the feature points.

An order of operations 320 and 330 may be arbitrarily determined. For example, operation 330 may be performed after operation 320, or operation 320 may be performed after operation 330. Operation 330 will be further described with reference to FIGS. 8 through 11.

Figure 8:
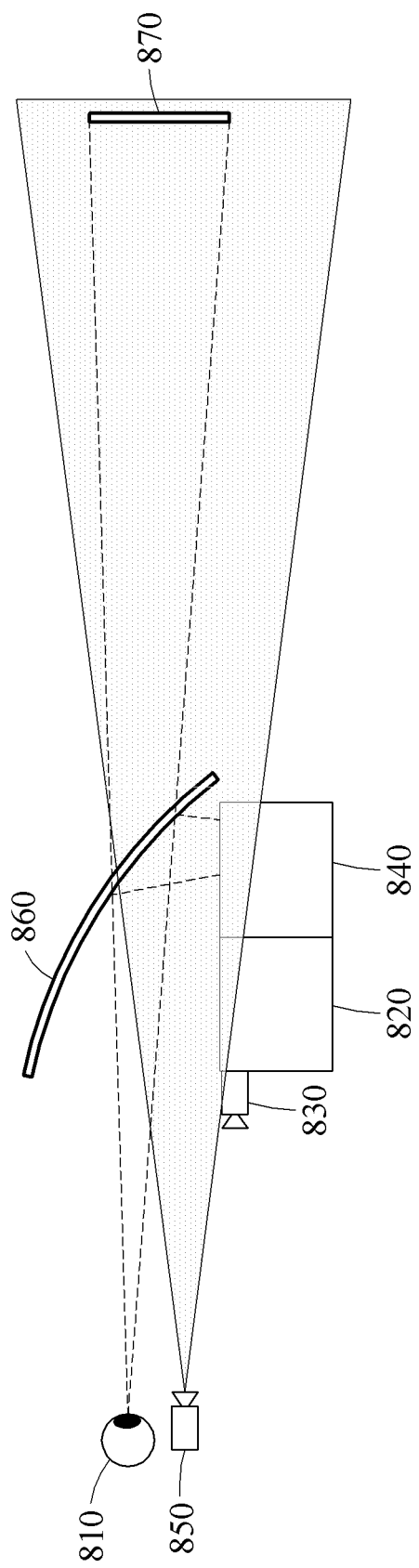
FIG. 8 is a diagram illustrating an arrangement of elements for estimating a size of a virtual screen and a relationship between a coordinate system of the virtual screen and a coordinate system of a calibration camera according to an exemplary embodiment.

FIG. 8 is a diagram illustrating an arrangement of elements for estimating a size of a virtual screen and a relationship between a coordinate system of the virtual screen and a coordinate system of a calibration camera according to an exemplary embodiment.

FIG. 8 illustrates an arrangement of a user's eye 810, a calibration apparatus 820, an eye-tracking camera 830, a display device 840, a calibration camera 850, a translucent optical element 860, and a virtual screen 870. The calibration camera 820 may determine a second conversion parameter representing a relationship between a coordinate system of the virtual screen 870 and a coordinate system of the calibration camera 850 and a size parameter representing a size of the virtual screen 870 by capturing a virtual pattern displayed on the virtual screen 870 using the calibration camera 850.

Figure 9:
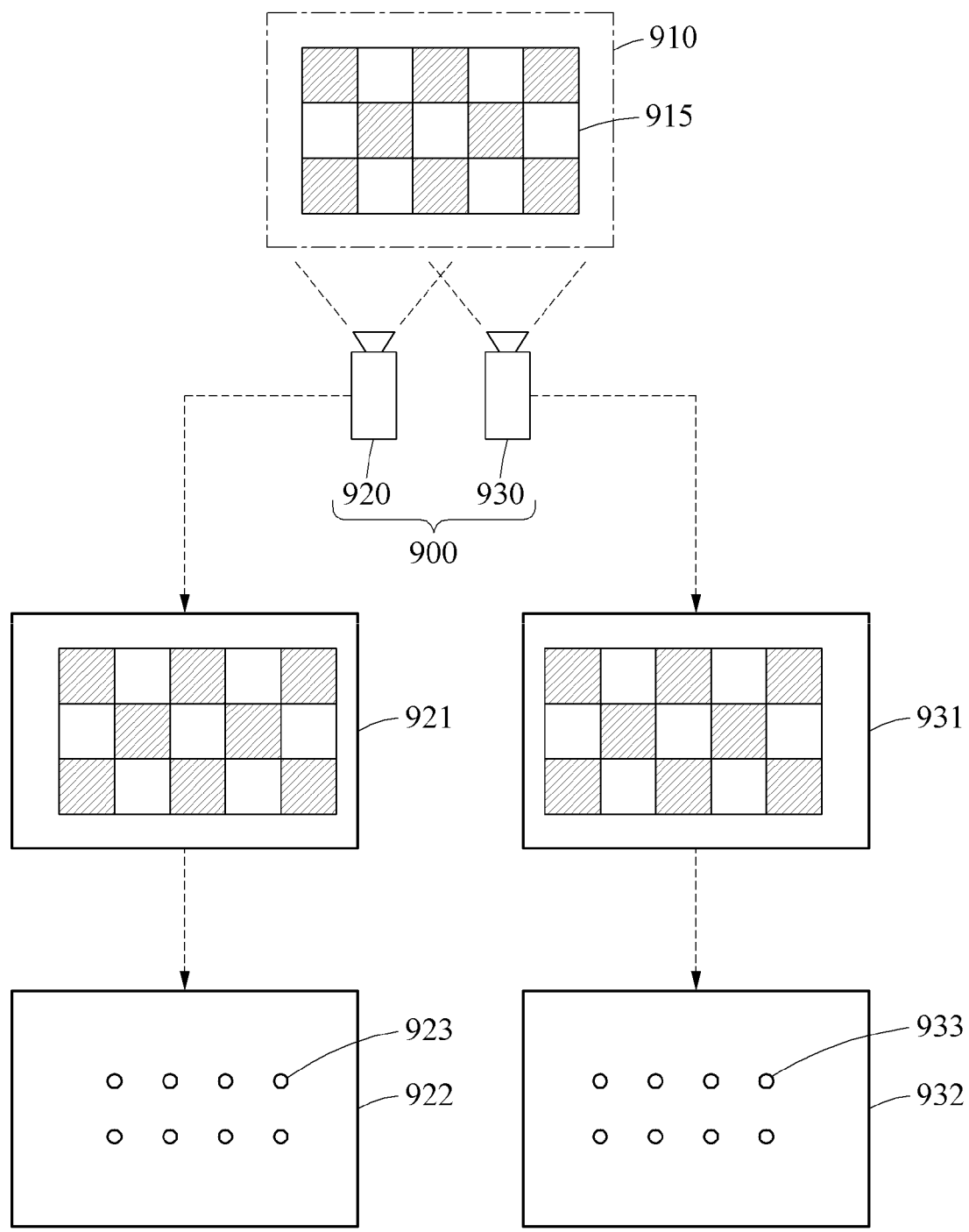
FIG. 9 is a diagram illustrating a process of extracting feature points included in a virtual pattern using a calibration camera according to an exemplary embodiment.

FIG. 9 is a diagram illustrating a process of extracting feature points included in a virtual pattern using a calibration camera according to an exemplary embodiment.

Referring to FIG. 9, a calibration camera 900 may generate images 921 and 931 by capturing a virtual pattern 915 displayed on a virtual screen 910. Although FIG. 9 illustrates a chessboard as the virtual pattern 915, the virtual pattern 915 may also be a different kind of pattern than the chessboard. The calibration camera 900 may include a first sub-camera 920 and a second sub-camera 930 which constitute a stereo camera. The first sub-camera 920 may generate the image 921 by capturing the virtual pattern 915. The second sub-camera 930 may generate the image 931 by capturing the virtual pattern 915.

The calibration apparatus may extract feature points 922 and feature points 932 from the images 921 and 931, respectively. The feature points 922 may be extracted from the image 921 and the feature points 932 may be extracted from the image 931. For example, when the virtual pattern 915 is a grid pattern, feature points may be lattice points. The feature points 922 may be represented by a coordinate system of the first sub-camera 920. The feature points 932 may be represented by a coordinate system of the second sub-camera 930. Among the feature points 922 and the feature points 932, feature points at corresponding positions may be referred to as a corresponding pair. For example, a feature point 923 and a feature point 933 may be a corresponding pair.

Figure 10:
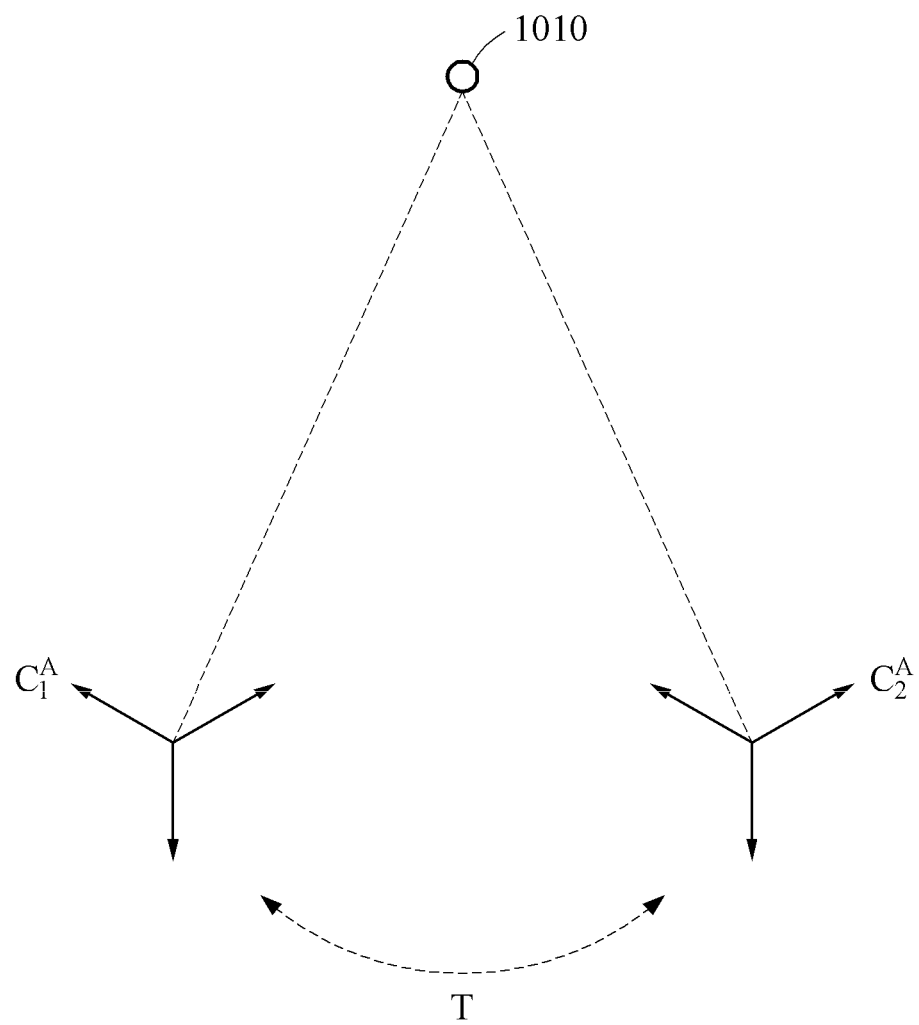
FIG. 10 is a diagram illustrating a process of estimating a position of one feature point included in a virtual pattern according to an exemplary embodiment.

FIG. 10 is a diagram illustrating a process of estimating a position of one feature point included in a virtual pattern according to an exemplary embodiment.

A calibration apparatus may estimate 3D positions of feature points using a conversion parameter T between a coordinate system $C_1^A$ of a first sub-camera and a coordinate system $C_2^A$ of a second sub-camera. For example, the calibration apparatus may estimate the 3D positions of the feature points based on 2D positions of feature points appearing in an image acquired by the first sub-camera capturing a virtual pattern, 2D positions of feature points appearing in an image acquired by the second sub-camera capturing a virtual pattern, and the conversion parameter T. The conversion parameter T may be determined in operation 310 of FIG. 3.

FIG. 10 illustrates a feature point 1010. The feature point 1010 may correspond to one position at which a predetermined corresponding pair of points among feature points extracted from images generated by the first sub-camera and the second sub-camera are represented using the conversion parameter T. For example, when the first sub-camera is a representative camera, the calibration apparatus may estimate a 3D position of the feature point 1010 based on the coordinate system $C_1^A$ of the first sub-camera using a triangulation method. Likewise, 3D positions of all feature points appearing in an image including a virtual pattern may be estimated.

Figure 11:
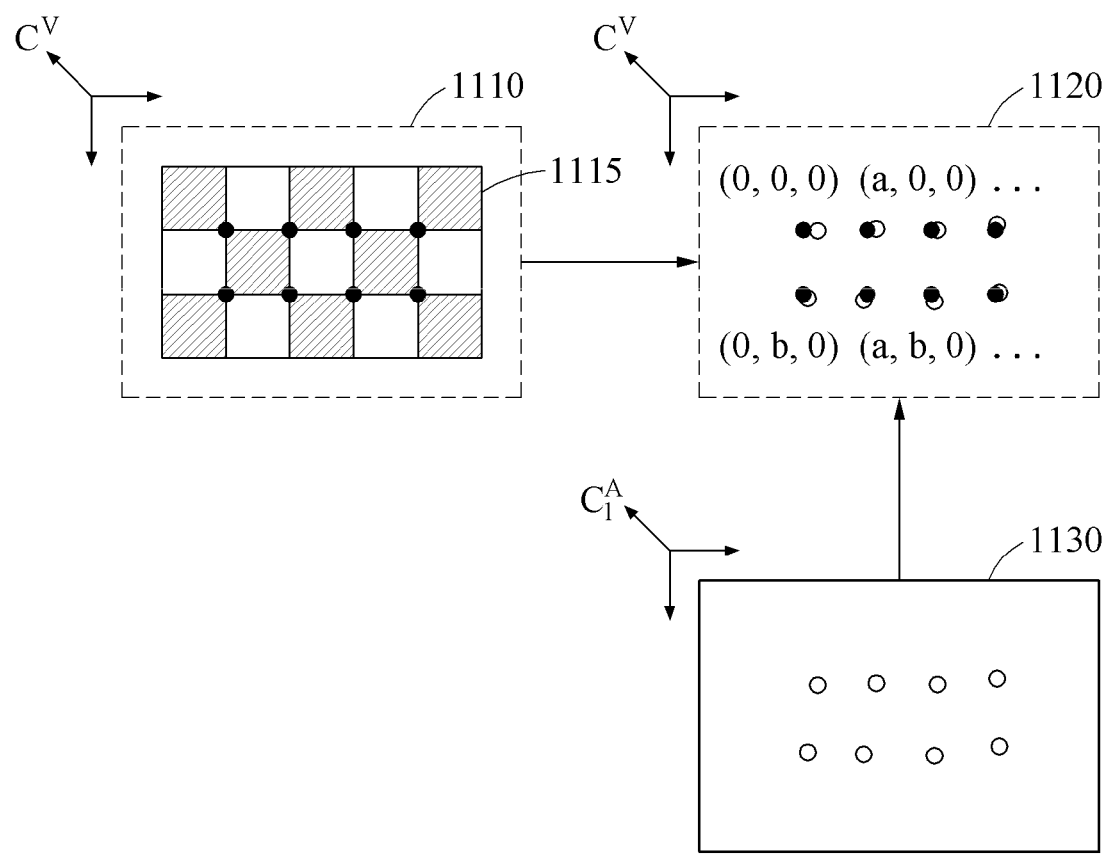
FIG. 11 is a diagram illustrating estimated feature point positions and parameterized feature positions according to an exemplary embodiment.

FIG. 11 is a diagram illustrating estimated feature point positions and parameterized feature positions according to an exemplary embodiment.

Referring to FIG. 11, a virtual pattern 1115 of a virtual screen 1110 includes feature points. Positions of the feature points of the virtual pattern 1115 may be parameterized based on a coordinate system $C^V$ of the virtual screen 1110. For example, the positions of the feature points of the virtual pattern 1115 may be parameterized based on a size of a unit cell of the virtual pattern 1115. When the size of the unit cell of the virtual pattern 1115 is a*b, among the feature points of the virtual pattern 1115 of FIG. 11, positions of feature points in a first row may be parameterized as (0, 0, 0), (a, 0, 0), (2a, 0, 0), and (3a, 0, 0) and positions of feature points in a second row may be parameterized as (0, b, 0), (a, b, 0), (2a, b, 0), and (3a, b, 0). If a=b, the positions of the feature points in the second row may be parameterized as (0, a, 0), (a, a, 0), (2a, a, 0), and (3a, a, 0).

As described with reference to FIG. 11, when a first sub-camera is a representative camera of a calibration camera, the calibration apparatus may estimate 3D positions of feature points based on a coordinate system $C_1^A$ of the first sub-camera. A block 1130 shows positions of the feature points estimated based on the coordinate system $C_1^A$ of the first sub-camera. The estimated positions of the feature points may be represented by the coordinate system $C^V$ of the virtual screen 1110 based on a conversion parameter between the coordinate system $C^V$ of the virtual screen 1110 and the coordinate system $C_1^A$ of the C first sub-camera. When the first sub-camera is a representative camera of the calibration camera, the coordinate system of the first sub-camera may be the coordinate system of the calibration camera. The conversion parameter between the coordinate system $C^V$ of the virtual screen 1110 and the coordinate system $C_1^A$ of the first sub-camera may correspond to the second conversion parameter described above.

A block 1120 shows the estimated positions of the feature points and the parameterized positions of the feature points based on the coordinate system $C^V$ of the virtual screen 1110. The calibration apparatus may determine the second conversion parameter and a size parameter by fitting the estimated positions of the feature points and the parameterized positions of the feature points. For example, the calibration apparatus may determine the second conversion parameter and the size parameter by minimizing differences between the estimated positions of the feature points and the parameterized positions of the feature points. The estimated positions of the feature points may include the second conversion parameter as a variable. Also, the parameterized positions of the feature points may include the size of the unit cell of the virtual pattern 1115 as a variable. Thus, the calibration apparatus may determine the second parameter and the size of the unit cell of the virtual pattern 1115 by minimizing the differences between the estimated positions of the feature points and the parameterized positions of the feature points. The calibration apparatus may determine the size parameter of the virtual screen 1110 based on known pixel information of a display panel and the size of the unit cell of the virtual pattern 1115.

Referring back to FIG. 3, in operation 340, the calibration apparatus outputs parameters. The calibration apparatus may determine a third conversion parameter representing a relationship between a coordinate system of an eye-tracking camera and a coordinate system of a virtual screen based on the first conversion parameter and the second conversion parameter. The calibration apparatus may return the first conversion parameter, the second parameter, and the size parameter, or may return the third conversion parameter and the size parameter.

Based on the returned parameters, a conversion relationship between the coordinate system of the eye-tracking camera and the coordinate system of the virtual screen may be estimated. The returned parameters may include the first conversion parameter, the second parameter, and the size parameter, or may include the third conversion parameter and the size parameter. The conversion relationship between the coordinate system of the eye-tracking camera and the coordinate system of the virtual screen may be used to convert the coordinate system of the virtual screen into the coordinate system of the eye-tracking camera and recognize a relationship between a position of an eye and a position of a virtual object. For example, an image for a 3D augmented reality may be rendered based on the conversion relationship between the coordinate system of the eye-tracking camera and the coordinate system of the virtual screen.

Figure 12:
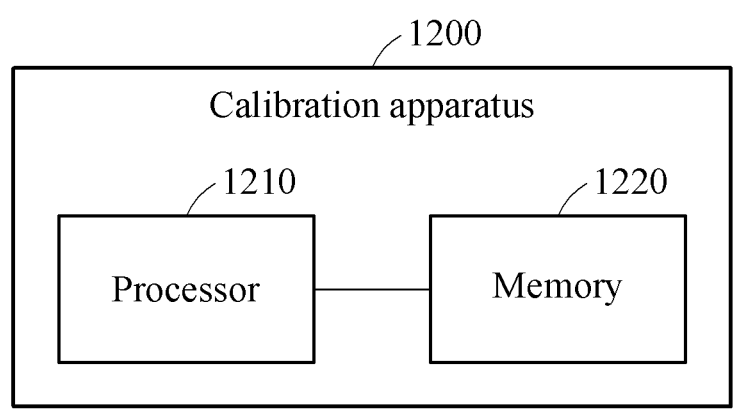
FIG. 12 is a block diagram illustrating a calibration apparatus according to an exemplary embodiment.

FIG. 12 is a block diagram illustrating a calibration apparatus according to an exemplary embodiment.

Referring to FIG. 12, a calibration apparatus 1200 includes a processor 1210 and a memory 1220. The memory 1220 may be connected to the processor 1210, and may store instructions executable by the processor 1210, data to be calculated by the processor 1210, or data processed by the processor 1210. The memory 1220 may include a non-transitory computer-readable medium, for example, a high-speed random access memory (RAM) and/or a non-volatile computer-readable storage medium (for example, one or more disk storage devices, a flash memory device, or other nonvolatile solid state memory devices).

The processor 1210 may execute instructions for performing one or more operations described with reference to FIGS. 1 through 11. For example, the processor 1210 may determine a first conversion parameter representing a relationship between a coordinate system of an eye-tracking camera and a coordinate system of a calibration camera by capturing a physical pattern using the eye-tracking camera and the calibration camera, determine a second conversion parameter representing a relationship between a coordinate system of a virtual screen and the coordinate system of the calibration camera by capturing a virtual pattern displayed on the virtual screen using the calibration camera, and determine a size parameter representing a size of the virtual screen.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A calibration method for a three-dimensional (3D) augmented reality, the method comprising:
    determining a first conversion parameter representing a first relationship between a first coordinate system of an eye-tracking camera and a second coordinate system of a calibration camera by capturing a physical pattern using the eye-tracking camera and the calibration camera;
    determining a second conversion parameter representing a second relationship between a third coordinate system of a virtual screen and the second coordinate system of the calibration camera and a size parameter representing a size of the virtual screen by capturing a virtual pattern displayed on the virtual screen using the calibration camera; and
    estimating a conversion relationship between the first coordinate system of the eye-tracking camera and the third coordinate system of the virtual screen based on the first conversion parameter, the second conversion parameter, and the size parameter.

2. The calibration method of claim 1, wherein the determining of the first conversion parameter comprises:
    determining a third conversion parameter representing a third relationship between the first coordinate system of the eye-tracking camera and a fourth coordinate system of the physical pattern based on an image acquired by the eye-tracking camera from capturing a reflector illuminating the physical pattern;
    determining a fourth conversion parameter representing a fourth relationship between the second coordinate system of the calibration camera and the fourth coordinate system of the physical pattern based on an image acquired by the calibration camera from capturing the physical pattern; and
    determining the first conversion parameter based on the third conversion parameter between the first coordinate system of the eye-tracking camera and the fourth coordinate system of the physical pattern and the fourth conversion parameter between the second coordinate system of the calibration camera and the fourth coordinate system of the physical pattern.

3. The calibration method of claim 1, wherein the determining of the second conversion parameter and the size parameter comprises:
    estimating positions of feature points included in the virtual pattern based on images acquired by the calibration camera capturing the virtual pattern; and
    determining the second conversion parameter and the size parameter based on the estimated positions of the feature points.

4. The calibration method of claim 1, wherein the determining of the second conversion parameter and the size parameter comprises:
    estimating positions of feature points included in the virtual pattern based on images acquired by the calibration camera capturing the virtual pattern;
    parameterizing the positions of the feature points based on the third coordinate system of the virtual screen; and
    determining the second conversion parameter and the size parameter by minimizing differences between the estimated positions of the feature points and the parameterized positions of the feature points.

5. The calibration method of claim 4, wherein the estimating of the positions of the feature points comprises:
    estimating 3D positions of the feature points based on two-dimensional (2D) positions of the feature points appearing in an image acquired by a first sub-camera of the calibration camera capturing the virtual pattern, 2D positions of the feature points appearing in an image acquired by a second sub-camera of the calibration camera capturing the virtual pattern, and a conversion parameter between a fifth coordinate system of the first sub-camera and a sixth coordinate system of the second sub-camera.

6. The calibration method of claim 4, wherein the parameterizing of the positions of the feature points comprises:
    parameterizing the positions of the feature points based on a size of a unit cell of the virtual pattern.

7. The calibration method of claim 1, wherein the size parameter includes values representing leftmost, rightmost, uppermost, and lowermost boundaries of the virtual screen.

8. The calibration method of claim 1, further comprising:
    determining intrinsic parameters of the eye-tracking camera and the calibration camera and a conversion parameter between a fifth coordinate system of a first sub-camera of the calibration camera and a sixth coordinate system of a second sub-camera of the calibration camera.

9. The calibration method of claim 1, wherein an image for a 3D augmented reality is rendered based on the conversion relationship between the first coordinate system of the eye-tracking camera and the third coordinate system of the virtual screen.

10. A non-transitory computer-readable storage medium storing instructions that, when executed by a processor, cause the processor to perform the calibration method of claim 1.

11. A calibration apparatus for a three-dimensional (3D) augmented reality, the apparatus comprising:
    a memory configured to store one or more instructions; and
    a processor, when the one or more instructions are executed, configured to:
        determine a first conversion parameter representing a first relationship between a first coordinate system of an eye-tracking camera and a second coordinate system of a calibration camera by capturing a physical pattern using the eye-tracking camera and the calibration camera;
        determine a second conversion parameter representing a second relationship between a third coordinate system of a virtual screen and the second coordinate system of the calibration camera and a size parameter representing a size of the virtual screen by capturing a virtual pattern displayed on the virtual screen using the calibration camera; and
        estimate a conversion relationship between the first coordinate system of the eye-tracking camera and the third coordinate system of the virtual screen based on the first conversion parameter, the second conversion parameter, and the size parameter.

12. The calibration apparatus of claim 11, wherein the processor is further configured to:
    determine a third conversion parameter representing a third relationship between the first coordinate system of the eye-tracking camera and a fourth coordinate system of the physical pattern based on an image acquired by the eye-tracking camera from capturing a reflector illuminating the physical pattern;
    determine a fourth conversion parameter representing a fourth relationship between the second coordinate system of the calibration camera and the fourth coordinate system of the physical pattern based on an image acquired by the calibration camera from capturing the physical pattern; and determine the first conversion parameter based on the third conversion parameter between the first coordinate system of the eye-tracking camera and the fourth coordinate system of the physical pattern and the fourth conversion parameter between the second coordinate system of the calibration camera and the fourth coordinate system of the physical pattern.

13. The calibration apparatus of claim 11, wherein the processor is further configured to:

estimate positions of feature points included in the virtual pattern based on images acquired by the calibration camera capturing the virtual pattern; and determine the second conversion parameter and the size parameter based on the estimated positions of the feature points.

14. The calibration apparatus of claim 11, wherein the processor is further configured to:

estimate positions of feature points included in the virtual pattern based on images acquired by the calibration camera capturing the virtual pattern;

parameterize the positions of the feature points based on the third coordinate system of the virtual screen; and determine the second conversion parameter and the size parameter by minimizing differences between the estimated positions of the feature points and the parameterized positions of the feature points.

15. The calibration apparatus of claim 14, wherein the processor is further configured to estimate 3D positions of the feature points based on two-dimensional (2D) positions of the feature points appearing in an image acquired by a first sub-camera of the calibration camera capturing the virtual pattern, 2D positions of the feature points appearing in an image acquired by a second sub-camera of the calibration camera capturing the virtual pattern, and a conversion parameter between a fifth coordinate system of the first sub-camera and a sixth coordinate system of the second sub-camera.

16. The calibration apparatus of claim 14, wherein the processor is further configured to parameterize the positions of the feature points based on a size of a unit cell of the virtual pattern.

17. A calibration system for a three-dimensional (3D) augmented reality, the system comprising:

a physical screen comprising a physical pattern;

a display device configured to generate a virtual screen comprising a virtual pattern;

an eye-tracking camera configured to capture the physical pattern;

a calibration camera configured to capture the physical pattern and the virtual pattern; and a processor configured to determine a first conversion parameter representing a first relationship between a first coordinate system of the eye-tracking camera and a second coordinate system of the calibration camera based on images generated by the eye-tracking camera and the calibration camera, a second conversion parameter representing a second relationship between a third coordinate system of the virtual screen and the second coordinate system of the calibration camera, and a size parameter representing a size of the virtual screen.

18. The calibration system of claim 17, wherein the processor is further configured to estimate a conversion relationship between the first coordinate system of the eye-tracking camera and the third coordinate system of the virtual screen based on the first conversion parameter, the second conversion parameter, and the size parameter.

19. The calibration system of claim 17, wherein the processor is further configured to:

determine a third conversion parameter representing a third relationship between the first coordinate system of the eye-tracking camera and a fourth coordinate system of the physical pattern based on an image acquired by the eye-tracking camera from capturing a reflector illuminating the physical pattern;

determine a fourth conversion parameter representing a fourth relationship between the second coordinate system of the calibration camera and the fourth coordinate system of the physical pattern based on an image acquired by the calibration camera from capturing the physical pattern; and determine the first conversion parameter based on the third conversion parameter between the first coordinate system of the eye-tracking camera and the fourth coordinate system of the physical pattern and the fourth conversion parameter between the second coordinate system of the calibration camera and the fourth coordinate system of the physical pattern.

20. The calibration system of claim 17, wherein the processor is further configured to:

estimate positions of feature points included in the virtual pattern based on images acquired by the calibration camera capturing the virtual pattern; and determine the second conversion parameter and the size parameter based on the estimated positions of the feature points.

21. A calibration method for a three-dimensional (3D) augmented reality, the method comprising:

determining a first conversion parameter representing a first relationship between a first coordinate system of an eye-tracking camera and a second coordinate system of a calibration camera based on a first image of a physical pattern reflected by a reflector and captured by the eye-tracking camera and a second image of the physical pattern directly captured the calibration camera;

determining a second conversion parameter representing a second relationship between a third coordinate system of a virtual screen and the second coordinate system of the calibration camera and a size parameter representing a size of the virtual screen by capturing a virtual pattern displayed on the virtual screen using the calibration camera; and estimating a conversion relationship between the first coordinate system of the eye-tracking camera and the third coordinate system of the virtual screen based on the first conversion parameter, the second conversion parameter, and the size parameter.

* * * * *